(12) United States Patent
Lee et al.

(10) Patent No.: US 11,315,204 B2
(45) Date of Patent: Apr. 26, 2022

(54) UPDATING SEQUENCE OF ONLINE COURSES FOR NEW LEARNERS WHILE MAINTAINING PREVIOUS SEQUENCES OF ONLINE COURSES FOR PREVIOUS LEARNERS

(71) Applicant: COURSERA, INC., Mountain View, CA (US)

(72) Inventors: Colleen Chia-Yen Lee, Palo Alto, CA (US); Yash Kshirsagar, Mountain View, CA (US); Yilei Qian, Millbrae, CA (US); Allison Fink, San Francisco, CA (US); Katharine Odell, Mountain View, CA (US); Christopher Moonlight Palmatier, Oakland, CA (US); Donald Geoffrey Schuller, San Jose, CA (US)

(73) Assignee: Coursera, Inc., Mountain View, CA (US)

( * ) Notice: Subject to any disclaimer, the term of this patent is extended or adjusted under 35 U.S.C. 154(b) by 324 days.

(21) Appl. No.: 16/381,730

(22) Filed: Apr. 11, 2019

(65) Prior Publication Data
US 2019/0318437 A1 Oct. 17, 2019

Related U.S. Application Data

(60) Provisional application No. 62/656,670, filed on Apr. 12, 2018.

(51) Int. Cl.
*G06Q 50/20* (2012.01)
*G09B 7/02* (2006.01)
*G06F 16/901* (2019.01)
*G09B 5/06* (2006.01)

(52) U.S. Cl.
CPC ....... *G06Q 50/205* (2013.01); *G06F 16/9024* (2019.01); *G09B 5/065* (2013.01); *G09B 7/02* (2013.01)

(58) Field of Classification Search
None
See application file for complete search history.

(56) References Cited

U.S. PATENT DOCUMENTS

| 5,310,349 | A  | * | 5/1994  | Daniels   | G09B 7/00    |
|-----------|----|---|---------|-----------|--------------|
|           |    |   |         |           | 345/156      |
| 6,633,886 | B1 | * | 10/2003 | Chong     | G06F 16/284  |
|           |    |   |         |           | 707/798      |
| 7,980,855 | B1 | * | 7/2011  | Scheuring | G09B 7/02    |
|           |    |   |         |           | 434/118      |
| 9,645,577 | B1 | * | 5/2017  | Frazzoli  | B60W 30/0956 |

(Continued)

*Primary Examiner* — William D Ermlick
(74) *Attorney, Agent, or Firm* — Brake Hughes Bellermann LLP

(57) ABSTRACT

A method can present a new sequence of online courses within a specialization for a group of new learners while maintaining a previous sequence of online courses within the specialization for a group of previous learners. The method can include maintaining a base class, associating a first learner with the base class, receiving a request to update a previous sequence of courses, generating a child class, associating a second learner with the child class, responding to a request for a sequence associated with the first learner, and responding to a request for a sequence associated with the second learner.

20 Claims, 8 Drawing Sheets

(56) References Cited

U.S. PATENT DOCUMENTS

| | | | |
|---|---|---|---|
| 2003/0040899 A1* | 2/2003 | Ogilvie | G06F 40/58 704/2 |
| 2003/0151629 A1* | 8/2003 | Krebs | G09B 5/00 715/810 |
| 2005/0026131 A1* | 2/2005 | Elzinga | G09B 5/00 434/365 |
| 2007/0009871 A1* | 1/2007 | Tidwell-Scheuring | G09B 7/02 434/350 |
| 2007/0031801 A1* | 2/2007 | Tidwell-Scheuring | G09B 7/00 434/322 |
| 2009/0111085 A1* | 4/2009 | Rudy | G09B 7/00 434/353 |
| 2011/0039242 A1* | 2/2011 | Packard | G09B 5/00 434/308 |
| 2011/0236870 A1* | 9/2011 | Chinosornvatana | G09B 7/08 434/322 |
| 2013/0073957 A1* | 3/2013 | DiGiantomasso | G06Q 50/20 715/705 |
| 2014/0052659 A1* | 2/2014 | Karandikar | G09B 5/06 705/326 |
| 2014/0099622 A1* | 4/2014 | Arnold | G09B 5/00 434/308 |
| 2014/0356846 A1* | 12/2014 | Su | G06N 5/043 434/362 |
| 2014/0377732 A1* | 12/2014 | Freedman | G09B 5/10 434/322 |
| 2015/0243179 A1* | 8/2015 | Zaslavsky | G06F 3/04842 434/327 |
| 2016/0189035 A1* | 6/2016 | Shakeri | G09B 5/00 706/47 |
| 2016/0314699 A1* | 10/2016 | Brinton | G09B 5/02 |
| 2017/0287198 A1* | 10/2017 | Feng | G06T 17/005 |
| 2017/0358234 A1* | 12/2017 | Bohlen | G09B 7/077 |
| 2018/0181676 A1* | 6/2018 | Khandelwal | G06F 16/90335 |
| 2019/0259289 A1* | 8/2019 | Bhattacharya | G09B 7/08 |
| 2019/0272775 A1* | 9/2019 | Noble | G09B 19/00 |
| 2019/0286751 A1* | 9/2019 | Ram | G06F 16/9024 |
| 2019/0378426 A1* | 12/2019 | Wu | G09B 5/02 |
| 2020/0001182 A1* | 1/2020 | Joung | A63F 13/69 |

* cited by examiner

UPDATING SEQUENCE OF ONLINE COURSES FOR NEW LEARNERS WHILE MAINTAINING PREVIOUS SEQUENCES OF ONLINE COURSES FOR PREVIOUS LEARNERS

PRIORITY CLAIM

This application claims the benefit of priority based on U.S. Provisional Application No. 62/656,670, filed on Apr. 12, 2018, entitled, "UPDATING SEQUENCE OF ONLINE COURSES FOR NEW LEARNERS WHILE MAINTAINING PREVIOUS SEQUENCES OF ONLINE COURSES FOR PREVIOUS LEARNERS," the disclosure of which is hereby incorporated by reference.

TECHNICAL FIELD

This description relates to maintaining and updating sequences of online courses.

BACKGROUND

Online courses, such as online courses presented in a massively open online course (MOOC) and presented to a user within a browser of a computer, can be organized into a sequence and/or ordered combination to form a specialization. The specialization can include a sequence and/or ordered combination of online courses related to a similar topic, and/or the completion of which will demonstrate mastery of a particular topic or area. Completion of all of the sequence of online courses in the specialization can demonstrate proficiency in a particular subject area.

Teachers and/or administrators of specializations may want to change the online courses within the specialization after some students have already begun taking courses within the specialization. It can be difficult to maintain a previous sequence of courses within the specialization for previous learners who have already begun taking courses within the specialization while updating the previous sequence and maintaining a new sequence of courses within the specialization for new learners who want to complete the specialization.

SUMMARY

According to an example, a method can present a new sequence of online courses within a specialization for a group of new learners while maintaining a previous sequence of online courses within the specialization for a group of previous learners. The method can include maintaining a base class, associating a first learner with the base class, receiving a request to update a previous sequence of courses, generating a child class, associating a second learner with the child class, responding to a request for a sequence associated with the first learner, and responding to a request for a sequence associated with the second learner. The base class can include a base course combination field identifying the previous sequence of online courses. The first learner can be from the group of previous learners. The receiving the request to update the previous sequence of courses can include receiving, from an administrator, a request to update the previous sequence of courses by removing at least a first online course from the previous sequence of online courses and adding at least a second online course to the previous sequence of courses to generate the new sequence of online courses. The generating the child class can include, in response to receiving the request to update the previous sequence of courses, generating the child class. The child class can include a child course combination field identifying the new sequence of online courses, and a child base identifier field referencing the base class. The second learner can be from the group of new learners. The responding to the request for the sequence associated with the first learner can include, in response to a first request for a sequence associated with the first learner from the group of previous learners, retrieving the previous sequence of online courses, and presenting the previous sequence of online courses to the first learner. The responding to the request for the sequence associated with the second learner can include, in response to a second request for a sequence associated with a second learner from the group of new learners, retrieving the new sequence of online courses, and presenting the new sequence of online courses to the second learner. The previous sequence of online courses can include at least the first online course that is not included in the new sequence of online courses. The new sequence of online courses can include at least the second online course that is not included in the previous sequence of online courses. The previous sequence of online courses and the new sequence of online courses can both include at least a third online course.

According to another example, a method of updating a database storing a specialization that represents a sequence of online courses can include presenting a previous sequence to a first learner, adding a new sequence node to a directed acyclic graph (DAG), adding edges from a new sequence node, removing a first edge, adding a second edge, presenting the previous sequence to a second learner, and presenting a new sequence to a third learner. The presenting the previous sequence to the first learner can include presenting a previous sequence of online courses to a first learner associated with the previous sequence. The previous sequence can include a first online course and a second online course, the previous sequence being represented in the database by a previous sequence node within the DAG. The DAG can include edges from the previous sequence node to at least a first course node representing the first online course in the previous sequence and a second course node representing the second online course in the previous sequence. The adding the new sequence node can include adding, to the DAG a new sequence node representing a new sequence of online courses. The new sequence of online courses can include the second online course and a third online course but not include the first online course. The adding edges can include adding edges from the new sequence node to the first course node and the second course node based on the previous sequence node having edges with the first course node and the second course node. The removing the first edge can include removing a first edge between the new sequence node and the first course node. The adding the second edge can include adding a second edge between the new sequence node and a third course node representing a third online course for which no edge exists between the third course node and the previous sequence node. The presenting the previous sequence to the second learner can include presenting, after the new sequence node has been added to the DAG the previous sequence of online courses to the second learner previously associated with the previous sequence before the new sequence node has been added to the DAG. The presenting the new sequence to the third learner can include presenting the new sequence of online courses to a third learner who has been associated with the new sequence of online courses.

According to another example, a non-transitory computer-readable storage medium can include instructions stored thereon for updating a database storing a specialization that represents a sequence of online courses. When executed by at least one processor, the instructions can be configured to cause a computing system to present a previous sequence of online courses to a first learner associated with the previous sequence, the previous sequence including a first online course and a second online course, the previous sequence being represented in the database by a previous sequence node within a directed acyclic graph (DAG), the DAG including edges from the previous sequence node to at least a first course node representing the first online course in the previous sequence and a second course node representing the second online course in the previous sequence. The instructions can be further configured to cause the computing system to add, to the DAG a new sequence node representing a new sequence of online courses, the new sequence of online courses including the second online course and a third online course but not including the first online course. The instructions can be further configured to cause the computing system to add edges from the new sequence node to the first course node and the second course node based on the previous sequence node having edges with the first course node and the second course node. The instructions can be further configured to cause the computing system to remove a first edge between the new sequence node and the first course node. The instructions can be further configured to cause the computing system to add a second edge between the new sequence node and a third course node representing a third online course for which no edge exists between the third course node and the previous sequence node. The instructions can be further configured to cause the computing system to present, after the new sequence node has been added to the DAG, the previous sequence of online courses to a second learner previously associated with the previous sequence before the new sequence node has been added to the DAG. The instructions can be further configured to cause the computing system to present the new sequence of online courses to a third learner who has been associated with the new sequence of online courses.

The details of one or more implementations are set forth in the accompanying drawings and the description below. Other features will be apparent from the description and drawings, and from the claims.

DETAILED DESCRIPTION

To enable previous learners to continue in a sequence of online courses for a specialization that they have already started after a teacher or administrator has updated the sequence for new learners, a computing system can maintain a base class that identifies an original and/or previous combination and/or sequence of online courses. A specialization can include a sequence of online courses and/or a combination of online courses, the successful completion of which demonstrates mastery of a particular topic of area. To enable a teacher or administrator to update the sequence and/or combination of online courses in the specialization, the computing system can generate a child class that identifies a new sequence of online courses. The computing system can associate previous learners with the base class, and associate new learners with the child class. In response to a request to view and/or retrieve a sequence of courses, the computing system can retrieve either the previous sequence or the new sequence depending on whether the request was received from a previous learner or a new learner.

Figure 1:
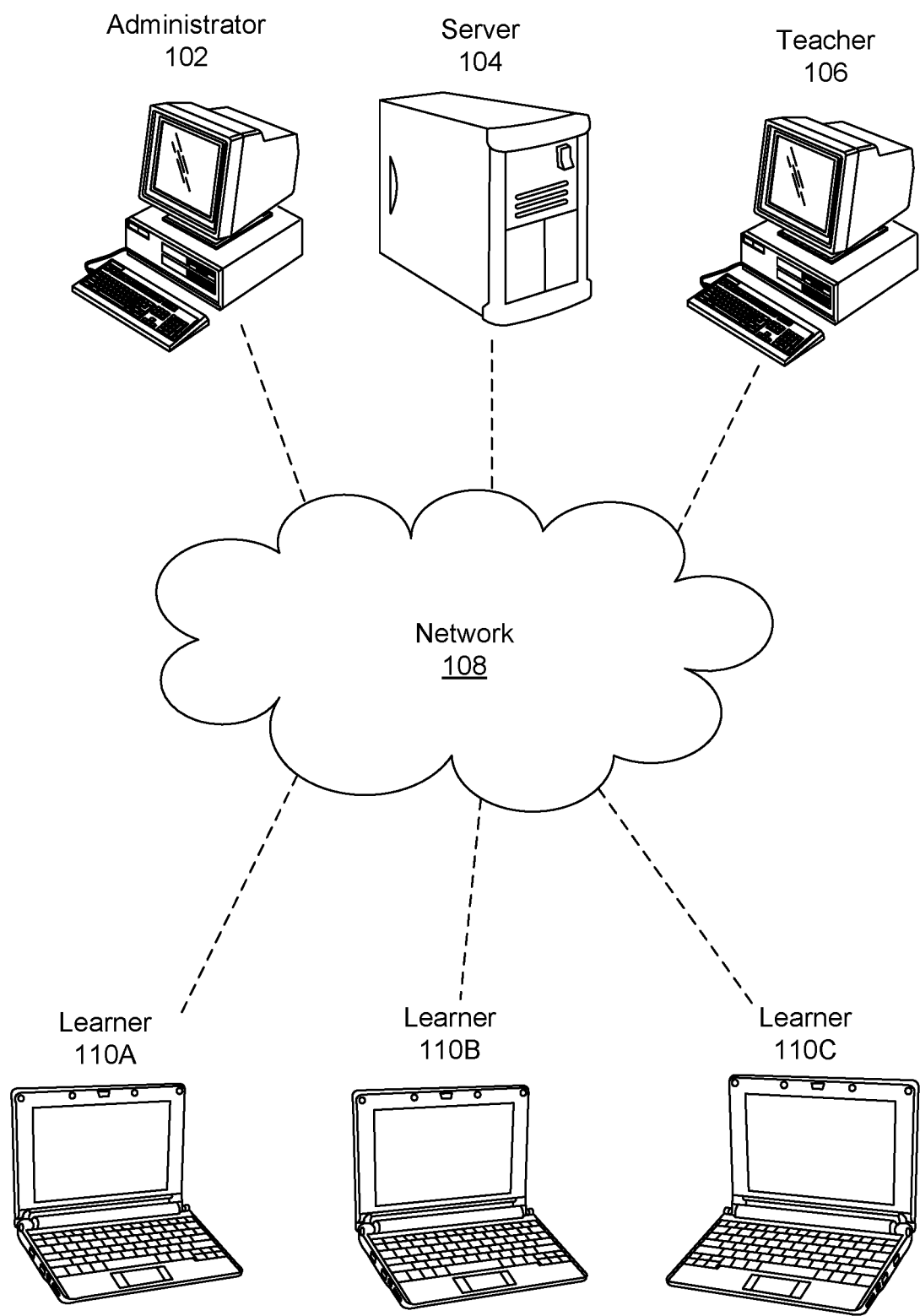
FIG. 1 is a network diagram showing entities that create, modify, maintain, and participate in online courses.

FIG. 1 is a network diagram showing entities that create, modify, maintain, and participate in online courses. An administrator device 102, which can include one or more computing devices such as a server, desktop computer, or laptop or notebook computer, can update specializations stored in a server 104 based on input from an administrator of the online courses and specializations, such as by adding and/or removing online courses to and/or from a sequence. The administrator device 102 can work with, and/or assist, a teacher device 106, which generates course content. The teacher device 106, which can include one or more computing devices such as a server, desktop computer, or laptop or notebook computer, can generate course content by, for example, uploading lectures and/or quizzes, inputted by a teacher, to the server 104, and/or can update a sequence of courses within a specialization.

The server 104, which can include one or more computing devices such as a server, desktop computer, or laptop or notebook computer, can maintain and/or store online courses, and present and/or download the courses to learner devices 110A, 110B, 110C. The server 104 can also create and maintain classes, such as base classes and child classes, that identify sequences of online courses. The server 104 can also retrieve sequences of online courses in response to requests from learner devices 110A, 110B, 110C.

The learner devices 110A, 110B, 110C can facilitate learners, who may also be considered users of the learner devices 110A, 110B, 110C, accessing the learners' accounts and/or online courses from the server 104 upon the respective learners logging in via the learner devices 110A, 110B, 110C. The learners, who can access course content to work toward completing specializations via the learner devices 110A, 110B, 110C, can each be associated with a single class and/or sequence of online courses per specialization and/or family of classes within a specialization. The learner devices 110A, 110B, 110C can request online courses within the sequence(s) from the server 104, and present the online courses to the respective learners. The administrator device 102, server 104, teacher device 106, and/or learner devices 110A, 110B, 110C can communicate with each other via a network 108 such as the Internet.

Figure 2A:
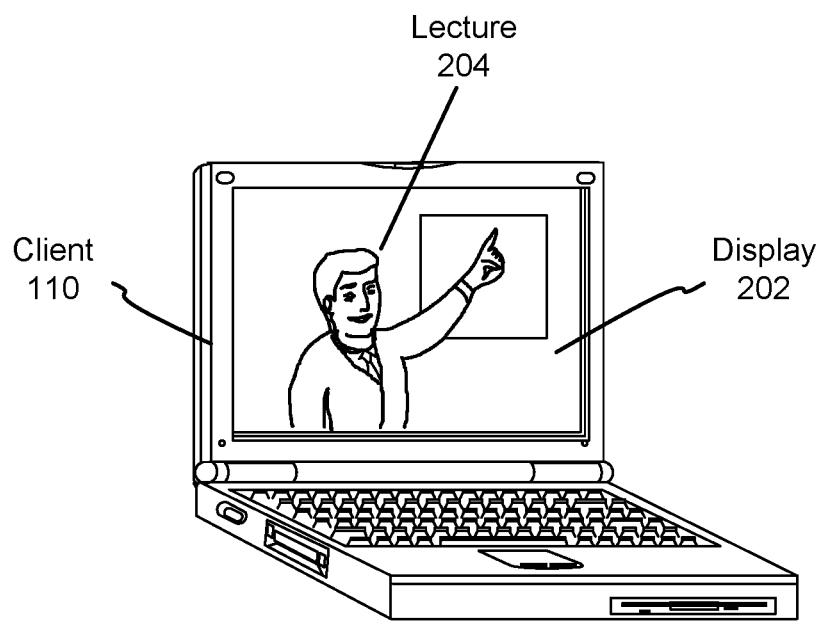
FIG. 2A is a diagram showing a learner device present a lecture within an online course.

FIG. 2A is a diagram showing a learner device 110 present a lecture 204 within an online course. The learner device 110 can represent any of the learner devices 110A, 110B, 110C shown and described above with respect to FIG. 1.

The learner device 110 can, based on input from a learner who has logged into an account maintained by the server 104, request the server 104 to provide course content, such as lectures and/or quizzes, to the learner device 110. FIG. 2A shows the learner device 110 presenting a lecture 204 to the learner. The lecture 204 can include a teacher speaking to learners in front of the learner devices 110A, 110B, 110C, a blackboard presentation, or other methods of presentation to the learner.

Figure 2B:
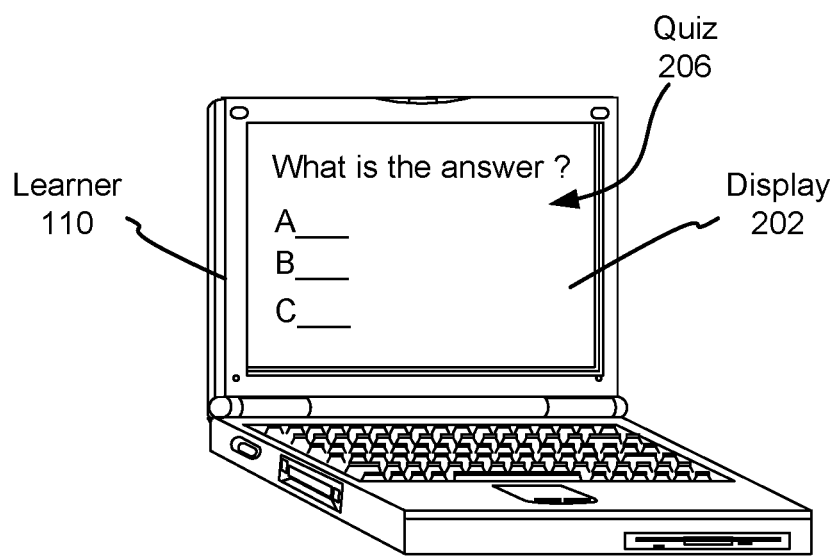
FIG. 2B is a diagram showing the learner device present a quiz within an online course.

FIG. 2B is a diagram showing the learner device 110 present a quiz 206 within an online course. The quiz 206 may have been generated and/or developed by the teacher. The quiz 206 can reinforce the concepts that have just been presented to the learner in the lecture 204. In some examples, the learner is considered to have passed and/or completed an online course upon passing all quizzes in the course. The online course may also require one or more projects to be completed before considering a learner to have passed and/or completed the online course.

Figure 3A:
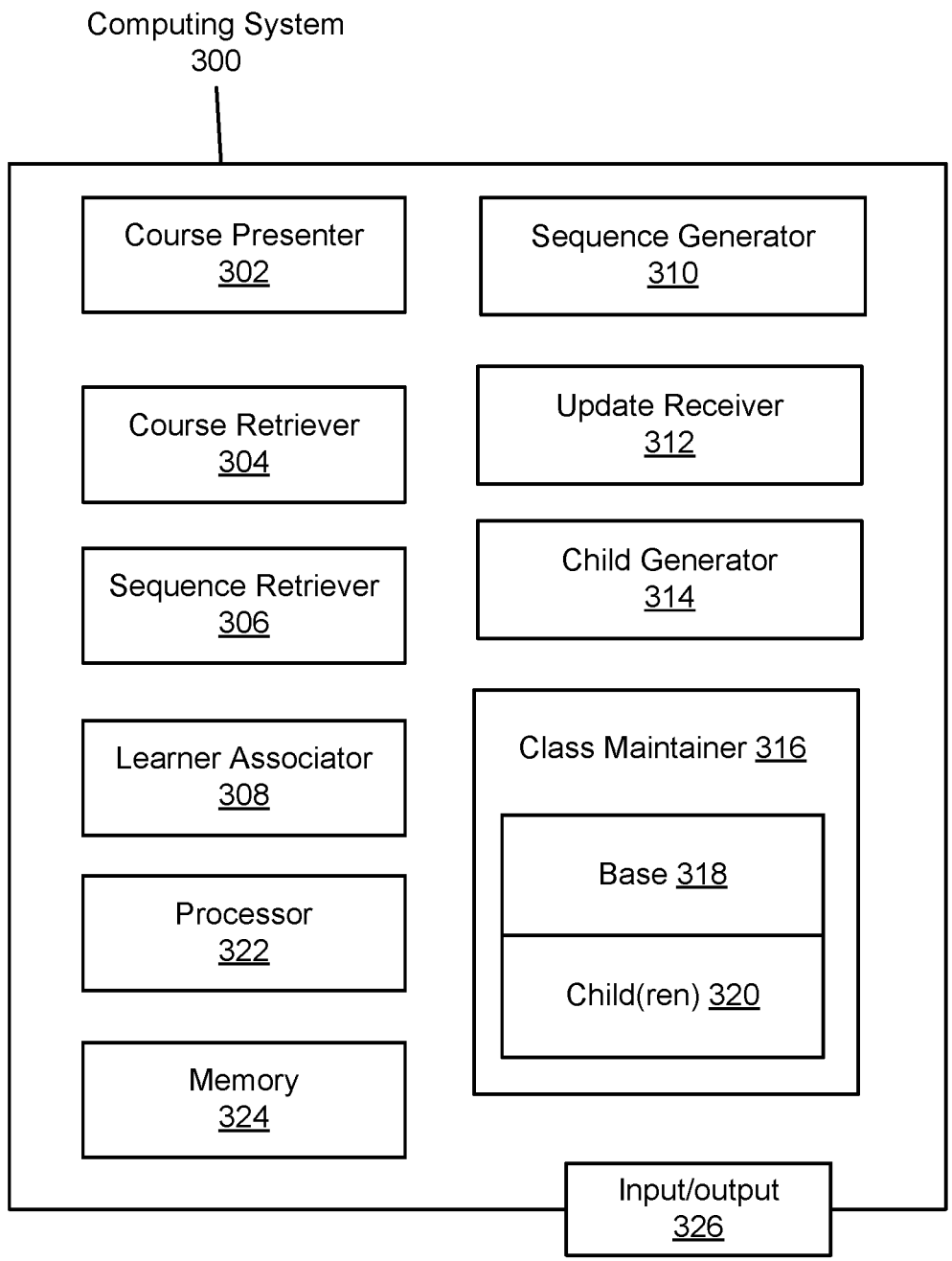
FIG. 3A is a block diagram of a computing system that presents online courses and generates and maintains sequences of online courses.

FIG. 3A is a block diagram of a computing system 300 that presents online courses and generates and maintains sequences of online courses. The computing system 300 can be included in, and/or implemented by, any combination of the administrator device 102, server 104, teacher device 106, and/or learner devices 110A, 110B, 110C.

The computing system 300 can include a course presenter 302. The course presenter 302 can present an online course to a learner device 110A, 110B, 110C, such as via the learner device 110. The online course may be transmitted by the server 104 to one or more of the learner devices 110A, 110B, 110C via the network 108. The learner device 110 can present the online course, which can include lecture 204 and/or quiz 206 components, to the learner.

The computing system 300 can include a course retriever 304. The course retriever 304 can retrieve an online course, within a sequence, for presentation to a learner. The learner device 110 can send a request for an online course to the server 104, and the server 104 can send the content of the online course to the learner device 110.

The computing system 300 can include a sequence retriever 306. The sequence retriever 306 can retrieve a sequence of online courses, which may comprise a specialization, associated with a particular learner. The sequence retriever 306 can determine which sequence within a specialization requested by the learner is associated with a particular user, and retrieve the determined sequence.

The computing system 300 can include a learner associater 308. The learner associater 308 can associate a learner with a particular sequence of online courses in response to the learner requesting to earn a specialization. The learner associater 308 can associate the learner with the most recent sequence of online courses when the learner requests to earn the specialization, and the learner can continue to be associated with the same sequence of online courses even when the specialization is updated and/or more recent sequences of online courses become available for the specialization. If the learner requests to change from a previous sequence of online courses to a most recent sequence of online courses for a specialization, then the learner associater 308 can disassociate the learner from the previous sequence of online courses and associate the learner with the most recent sequence of online courses for the specialization.

The computing system 300 can include a sequence generator 310. The sequence generator 310 can generate a sequence of online courses that form a specialization. The sequence generator 310 can generate the sequence based on input from the teacher device 106, such as the teacher generating the online courses in the sequence and/or selecting the online courses to form the sequence via the teacher device 106. The sequence generator 310 can generate and/or maintain a base class that identifies the generated sequence of online courses that form the specialization.

The computing system 300 can include an update receiver 312. The update receiver 312 can receive updates, such as from the teacher device 106 and/or administrator device 102, to sequences of online courses. The updates can include additions and/or removals of online courses to and/or from sequences.

The computing system 300 can include a child generator 314. The child generator 314 can generate a child class that identifies the sequence of online courses after the addition and/or removal performed by the update receiver 312. In some examples, the child generator 314 can generate multiple child classes, one child class for each update to the sequence of online courses performed by the update receiver 312.

The computing system 300 can include a class maintainer 316. The class maintainer 316 can be a database that maintains classes that identify sequences of online courses, such as base classes 318 and child classes 320. The class maintainer 316 can maintain classes for multiple sequences of online courses.

The class maintainer 316 can maintain the base class 318. The base class 318 can identify an original and/or previous sequence of online courses. The base class 318 can identify the first sequence of online courses generated and/or selected by the teacher device 106. The base class 318 can be associated with learners within a group of previous learners who began the specialization before a child and/or subsequent class for the specialization was created.

The class maintainer 316 can maintain one or more child classes 320. The child classes 320, which may have been generated by the child generator 314, can identify updated sequences of online courses. The child classes 320 can include one child class for each update performed by the update receiver 312. The child class(es) 320 can each be associated with a different group of new learners who began the specialization when the respective child class 320 was a most recent class for the specialization.

The computing system 300 can include at least one processor 322. The at least one processor 322 can execute instructions, such as instructions stored in at least one memory device 324, that cause the computing system 300 to perform any combination of functions, techniques, and/or methods described herein.

The computing system 300 can include at least one memory device 324. The at least one memory device 324 can include a non-transitory computer-readable storage medium storing instructions thereon that, when executed by the at least one processor 322, cause the computing system 300 to perform any combination of functions, techniques, and/or methods described herein. The at least one memory device 324 can also store data generated by, and/or accessed by, the computing system 300 when performing any combination of functions, techniques, and/or methods described herein.

The computing system 300 can include at least one input/output node 326. The at least one input/output node 326 can both send and receive data, or can include separate nodes that only send data and only receive data. In some examples, the input/output node 326 can include one or more human interface devices that receive data from users, such as keyboards, computer mice, trackpads, or touchscreens, and/or one or more output devices to present information to users, such as displays or speakers. In some examples, the input/output node 326 can include one or more nodes for transmitting and/or receiving data to and/or from other computing devices, such as wired nodes including a twisted pair, coaxial cable, optical fiber, or Institute for Electrical and Electronics Engineers (IEEE) 802.3 Ethernet, and/or wireless nodes such as cellular communication nodes (according to protocols such as Global System for Mobile Communications (GSM), General Packet Radio Service (GPRS), Universal Mobile Telecommunications System (UMTS), or Long-Term Evolution (LTE)), Wireless Local Area Network (WLAN) nodes such as IEEE 802.11 nodes, or personal area network (PAN) nodes such as Bluetooth IEEE 802.15 nodes.

Figure 3B:
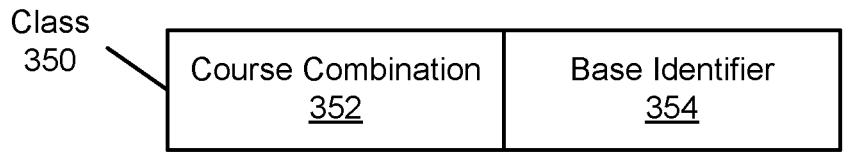
FIG. 3B is a diagram of a class that maintains a sequence of online courses.

FIG. 3B is a diagram of a class 350 that maintains a sequence of online courses. The class 350 can be a base class, which can be the first and/or original class that the sequence generator 310 generated for a specialization, or can be a child class generated by the child generator 314 based on updates to the base class or updates to a subsequent child class.

The class 350 can include at least a course combination field 352, which can be a base course combination field when the class 350 is a base class, and can be a child course combination field when the class 350 is a child class. The course combination field 352 can identify a sequence of online courses that, when completed by a learner, entitle the learner to earn a certificate demonstrating completion of a specialization. For a base class, the course combination field 352 can identify a previous sequence of online courses. For a child class, the course combination field 352 can identify an updated sequence and/or new sequence of online courses.

The class 350 can include a base identifier field 354. The base identifier field 354 can be considered a child base identifier field when the class 350 is a child class. The base identifier field 354 can identify a base class of the specialization. For the base class, the base identifier field 354 can be blank and/or null (NULL) or hold the null value, indicating that the class 350 is the base class and/or original class of the specialization. For each child class, the base identifier field 354 can identify the base class of the specialization, so that for any class and/or specialization, the computing system 300 can identify the base class by referring to the base identifier field 354 of any child class.

Figure 4A:
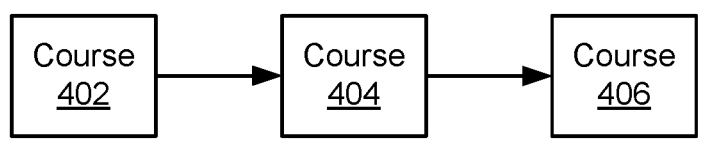
FIG. 4A is a block diagram of a previous sequence of online courses.

FIG. 4A is a block diagram of a previous sequence 400 of online courses 402, 404, 406. The sequence generator 310 can generate the previous sequence 400 of online courses 402, 404, 406 based on input from the teacher via the teacher device 106. The teacher device 106 can generate, upload, and/or identify the courses 402, 404, 406 in the previous sequence 400 that a learner must complete to earn a certificate indicating completion of a specialization. In the example shown in FIG. 4A, course 402 is completed before, and/or is a prerequisite to, course 404, and course 404 is completed before, and/or is a prerequisite to, course 406. Completion of all three courses 402, 404, 406 would entitle a learner associated with the previous sequence 400 to a certificate indicating completion of the specialization.

Figure 4B:
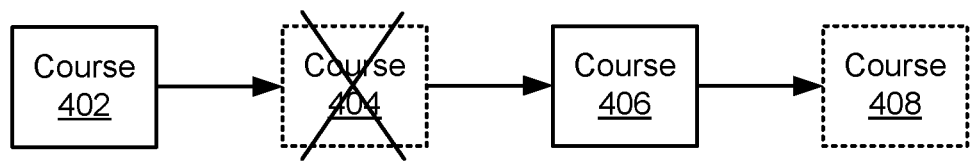
FIG. 4B is a block diagram showing addition of an online course and removal of an online course from the previous sequence of online courses.

FIG. 4B is a block diagram showing addition of an online course 408 and removal of an online course 404 (410) from the previous sequence 400 of online courses. The teacher may have determined that a different combination of courses would be more optimal for a specialization, and remove a course 404 from the sequence and add a course 408 to the sequence. The update receiver 312 can receive, from the teacher device 106, a request to remove the course 404 and a request to add the course 408. The update receiver 312 can respond to the requests to remove the course 404 by removing the course 404 from the sequence 400, and respond to the request to add the course 408 to the previous sequence by adding course 408 to the sequence.

Figure 4C:
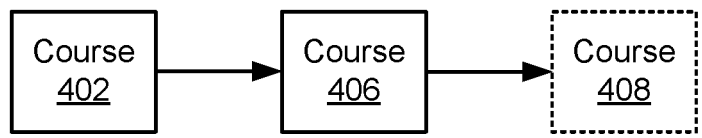
FIG. 4C is a block diagram of a new sequence of online courses after the addition and removal shown in FIG. 4B.

FIG. 4C is a block diagram of a new sequence 420 of online courses 402, 406, 408 after the addition and removal (410) shown in FIG. 4B. As shown in FIG. 4C, after the removal of course 404 and addition of course 408, the new sequence 420 includes, and/or consists of, courses 402, 406, 408. In this example, course 402 is completed before, and/or is a prerequisite to, course 406, and course 406 is completed before, and/or is a prerequisite to, course 408. Completion of all three courses 402, 406, 408 would entitle a learner associated with the new sequence 420 to a certificate indicating completion of the same specialization as completion of the three courses 402, 404, 406 by a learner associated with the previous sequence 400.

Figure 5:
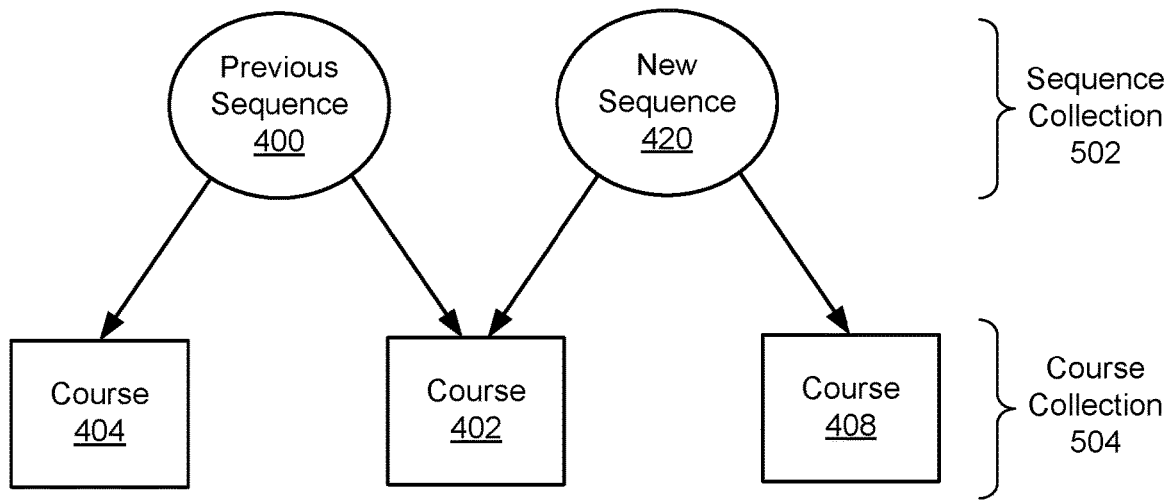
FIG. 5 is a diagram showing relationships between sequences of online courses and the online courses in the sequences.

FIG. 5 is a diagram showing relationships between sequences 400, 420 of online courses 402, 404, 408 and the online courses 402, 404, 408 in the sequences 400, 420. Course 406, which was included in both sequences 400, 420 shown and described with respect to FIGS. 4A, 4B, and 4C, is not shown in FIG. 5 for ease of illustration. In some examples, the computing system 300 can store a sequence collection 502, which can include the previous sequence 400 and the new sequence 420, in the class maintainer 316 and/or memory 324. In some examples, the computing system 300 can store a course collection 504, which can include courses 402, 404, 406, 408, in the class maintainer 316 and/or memory 324.

In the example shown in FIG. 5, the previous sequence 400, which may be considered a previous sequence node, includes courses 402, 404, and/or shares edges with the course nodes representing courses 402, 404. The new sequence 420, which may be considered a new sequence node, includes courses 402, 408, and/or shares edges with the course nodes representing courses 402, 408. Course 404 is included in the previous sequence 400 but is not included in the new sequence because course 404 was removed from the sequence, as shown in FIG. 4B. Course 402 is included in both the previous sequence 400 and the new sequence 420 because course 402 was included in the original and/or previous sequence 400 and was not added or removed, as shown in FIG. 4B. Course 408 is included in the new sequence 420 but is not included in the previous sequence because course 408 was added to the previous sequence 400, as shown in FIG. 4B. The computing system 300 can store the inclusions of courses 402, 404, 408 (as well as course 406) in the sequences 400, 420 as a directed acyclic graph (DAG), with the courses 402, 404, 408 and sequences 400,

420 represented as nodes and edges pointing from the sequences 400, 420 to the courses 402, 404, 408 included in the respective sequences 400, 420, as shown by the arrows and/or edges shown in FIG. 5.

When the update receiver 312 receives a request to update a sequence, the update receiver 312 can recompute the edges in the DAG. The update receiver 312 can, for example, add a new node representing a child class and add edges from the new node representing the child class to all of the same nodes representing courses as the previously most recent class (which may have been a child class or base class). The update receiver 312 can then remove edges between the new node and nodes representing courses that are removed from the sequence, and add edges between the new node and nodes representing courses that are added to the sequence. When the removals and additions are complete, the DAG will represent the associations between the new, most recent child class, and the courses included in the sequence represented by the new, most recent child class. The storing of associations and/or inclusions of online courses within sequences as a DAG can reduce memory usage in storing multiple sequences, and can reduce latencies when updating sequences and/or creating new child classes.

Figure 6:
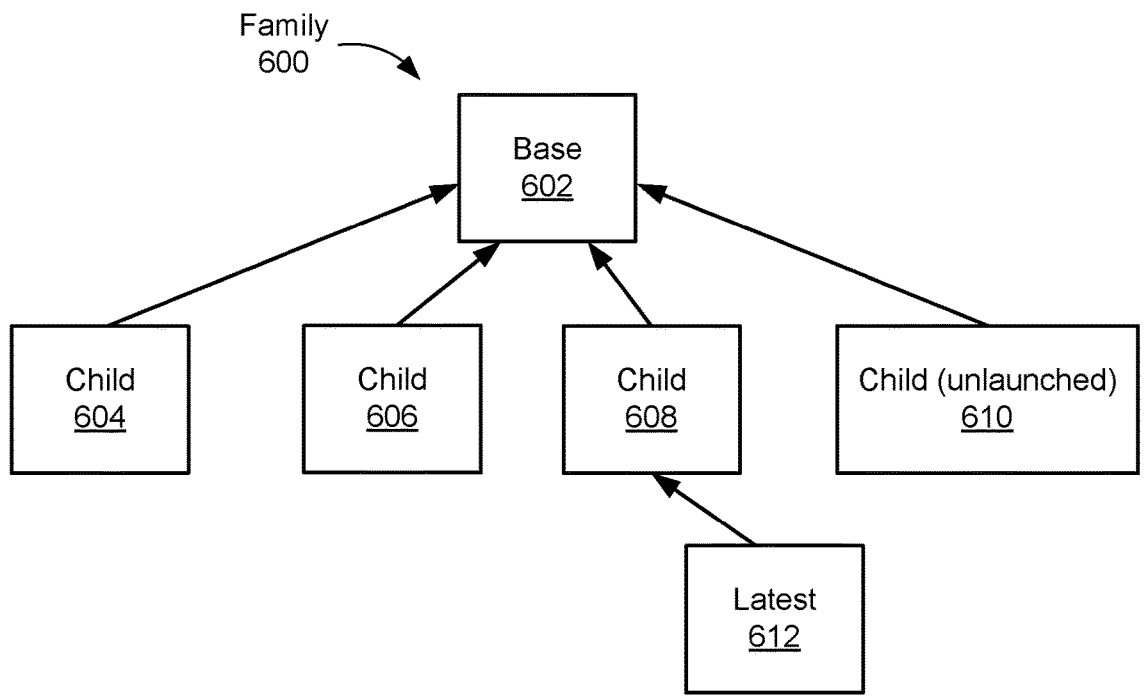
FIG. 6 is a diagram showing a family of sequences within a specialization.

FIG. 6 is a diagram showing a family 600 of sequences within a specialization. The family 600 can include all sequences in the specialization, including the base class 602 and the child classes 604, 606, 608, 610. The child classes 604, 606, 608, 610 can each include an identifier of, and/or reference to, the base class 602. The references and/or identifiers can be included in the base identifier field 354 shown in FIG. 3B.

The family 600 can include launched child classes 604, 606, 608, which are available as sequences of courses for learners to earn the certificate indicating completion of the specialization. The child classes 604, 606, 608 can be considered subsequent classes to the base class 602, the child classes 606, 608 can be considered subsequent classes to the base class 602 and child class 604, and the child class 608 can be considered subsequent classes to the base class 602 and child classes 604, 606. In some examples, the family 600 can include one or more unlaunched child classes 610. An unlaunched child class 610 may have been generated by the child generator 314, but may not yet be available as a sequence of online courses for a learner to enroll in to earn the certificate indicating completion of the specialization.

In some examples, the family 600 can include a latest object 612. The latest object 612 can identify, and/or reference, a latest version of a specialization, such as a most recently launched child class 608. The latest object 612 can include a latest field that references the most recent child class for the specialization, and/or a most recent version of the specialization. When a learner requests to begin and/or be associated with a specialization, the computing system 300 can check the latest object 612 to determine a most recently launched child class 608, which can be considered a latest class for the specialization, and associate the learner with the most recently launched child class 608. The computing system 300 can present the courses in the most recently launched child class 608 to the public and/or prospective learners who are interested in earning the specialization. A learner can be associated with at least one class in the family 600, either the base class 602 or one of the launched child classes 604, 606, 608.

The computing system 300 can support, and/or respond to, methods and/or functions performed on the family 600 and/or any class 350. A base method can return the base class 602 of the family 600 in response to a client request for the base of a specialization. A family method can return the entire family 600, and/or all classes in the family 600, including the base class 602 and all the children 604, 606, 608, 610 of the base class 602, in response to a client request for the family of the specialization. A latest method can return a latest and/or more recent class, such as the latest object 612 and/or the child class 608 identified by and/or referenced by the latest object 612, in response to a client request for the latest and/or most recent class of the specialization. An all latest method can return the latest objects 612 and/or child classes 608 identified by and/or referenced by the latest objects 612 in all specializations, sequences, and/or families 600 maintained by the class maintainer of the computing system 300, in response to a client request for the latest objects and/or child classes. A get learners method performed on the base class 602 or any of the launched child classes 604, 606, 608 can return the status of learners for the classes 602, 604, 606, 608 upon which the get learners method is performed, such as which online courses in the respective sequence each of the learners has or has not completed.

Figure 7:
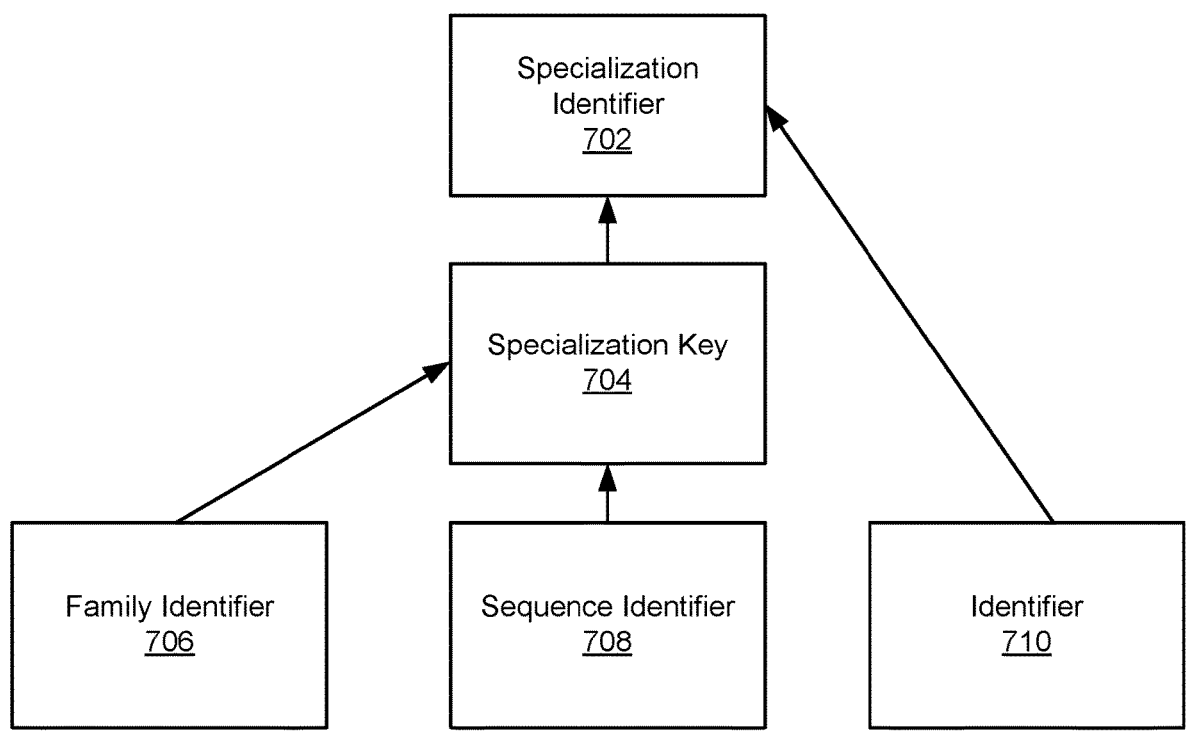
FIG. 7 is a diagram showing relationships between data structures for maintaining sequences of online courses.

FIG. 7 is a diagram showing relationships between data structures for maintaining sequences of online courses. A specialization identifier 702 is a parent class for a specialization. The server 104 can retrieve a specialization based on the specialization identifier 702. A specialization key 704 can serve as the key for the specialization, enabling the computing system 300 to identify a specialization and retrieve the specialization identifier. The specialization may have multiple possible sequences of courses identified by the base class and child classes.

The specialization key 704 can have two subtypes, a family identifier 706 and a sequence identifier 708. The family identifier 706 can be an original class for the specialization, and/or can be the base class 602. The family identifier 706 can indicate a number of child classes in the family 600 and/or a total number of sequences of online courses in the family 600. The sequence identifier 708 can be a primary key for a subsequent sequence, such as one of the child classes 604, 606, 608. An identifier 710 can include a reference to the specialization identifier 702, enabling the computing system 300 to find the specialization based on the identifier 710.

Figure 8:
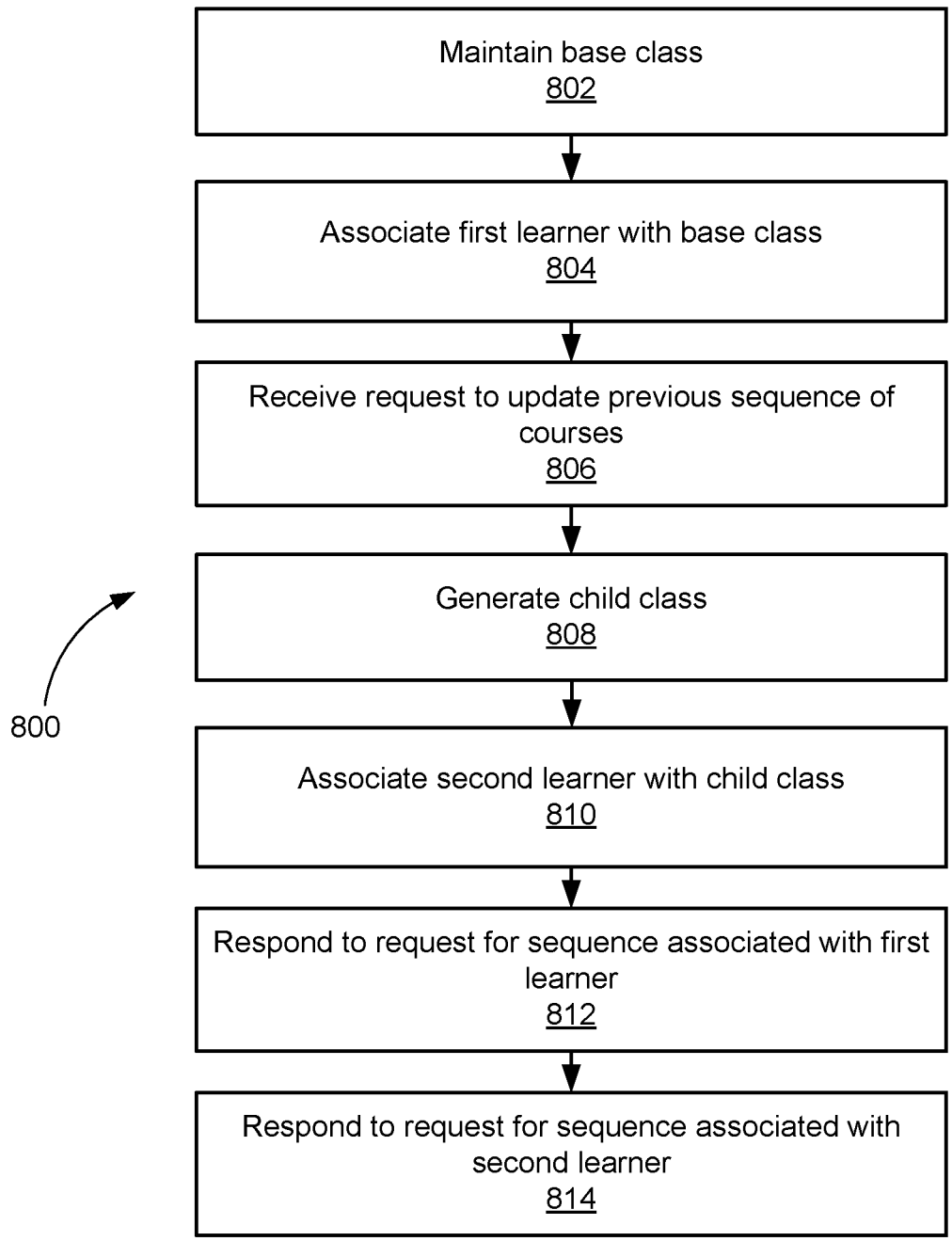
FIG. 8 is a flowchart showing a method according to an example implementation.

FIG. 8 is a flowchart showing a method 800 according to an example implementation. According to this example, the method 800 can present a new sequence 420 of online courses 402, 406, 408 within a specialization for a group of new learners while maintaining a previous sequence 400 of online courses 402, 404, 406 within the specialization for a group of previous learners. The method 800 can include maintaining a base class 318 (802), associating a first learner with the base class 318 (804), receiving a request to update a previous sequence 400 of courses (806), generating a child class 320 (808), associating a second learner with the child class 300 (810), responding to a request for a sequence associated with the first learner (812), and responding to a request for a sequence associated with the second learner (814). The base class can include a base course combination field 352 identifying the previous sequence of online courses. The first learner can be from the group of previous learners. The receiving the request to update the previous sequence of courses (806) can include receiving, from an administrator 102, a request to update the previous sequence of courses by removing at least a first online course 404 from the previous sequence 400 of online courses and adding at least a second online course 408 to the previous sequence of courses to generate the new sequence 420 of online courses. The generating the child class (808) can include, in response to receiving the request to update the previous sequence of courses, generating the child class 320. The child class 320 can include a child course combination field 352 identifying the new sequence 420 of online courses, and a child base identifier field 354 referencing the base class. The second learner can be from the group of new learners. The responding to the request for the sequence associated with the first learner (812) can include, in response to a first request for a sequence associated with the first learner from the group of previous learners, retrieving the previous sequence 400 of online courses, and presenting the previous sequence 400 of online courses to the first learner. The responding to the request for the sequence associated with the second learner (814) can include, in response to a second request for a sequence associated with a second learner from the group of new learners, retrieving the new sequence 420 of online courses, and presenting the new sequence 420 of online courses to the second learner. The previous sequence 400 of online courses can include at least the first online course 404 that is not included in the new sequence 420 of online courses. The new sequence 420 of online courses can include at least the second online course that is not included in the previous sequence 400 of online courses. The previous sequence 400 of online courses and the new sequence 420 of online courses can both include at least a third online course 402, 406.

According to an example, the base class can further include a base identifier field 354 that stores a null value.

According to an example, the method 800 can further include maintaining a latest class 612 the latest class 612 including a latest field that references the child class.

According to an example, the method 800 can further include determining that the new sequence 420 of online courses is a most recent version of the specialization by checking the latest field in the latest class, and checking the child course combination field of the child class based on the latest field referencing the child class.

According to an example, the method 800 can further include returning the base class in response to a client request for the previous sequence of online courses.

According to an example, the method 800 can further include returning the base class and the child class in response to a client request for a family of the specialization.

According to an example, the method 800 can further include returning the child class in response to a client request for the new sequence of online courses.

According to an example, each learner in the group of previous learners can be associated with the base class 318 and not be associated with the child class 320.

According to an example, each learner in the group of new learners can be associated with the child class 320 and not be associated with the base class 318.

According to an example, the method 800 can further include, in response to a request from the first learner to update the specialization, disassociating the first learner from the base class 218, and associating the first learner with the child class 320.

Figure 9:
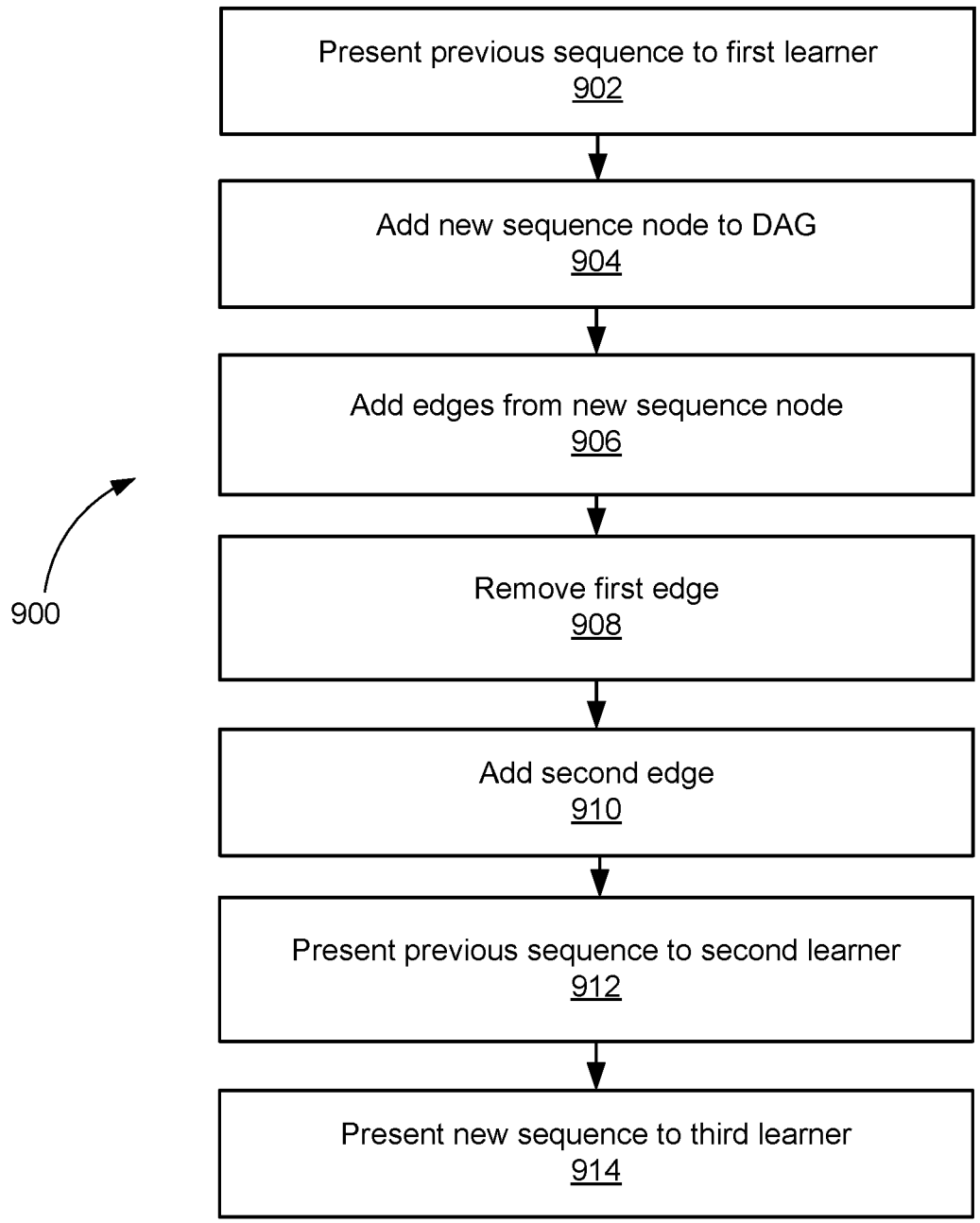
FIG. 9 is a flowchart showing a method according to another example implementation.

FIG. 9 is a flowchart showing a method 900 according to another example implementation. The method 900 can be a method of updating a database storing a specialization that represents a sequence of online courses. The method 900 can include presenting a previous sequence of online courses to a first learner associated with the previous sequence (902), the previous sequence including a first online course and a second online course, the previous sequence being represented in the database by a previous sequence node within a directed acyclic graph (DAG), the DAG including edges from the previous sequence node to at least a first course node representing the first online course in the previous sequence and a second course node representing the second online course in the previous sequence. The method 900 can include adding, to the DAG a new sequence node representing a new sequence of online courses (904), the new sequence of online courses including the second online course and a third online course but not including the first online course. The method 900 can include adding edges from the new sequence node (906) to the first course node and the second course node based on the previous sequence node having edges with the first course node and the second course node. The method 900 can include removing a first edge (908) between the new sequence node and the first course node. The method 900 can include adding a second edge (908) between the new sequence node and a third course node representing a third online course for which no edge exists between the third course node and the previous sequence node. The method 900 can include presenting, after the new sequence node had been added to the DAG the previous sequence of online courses to a second learner (912) previously associated with the previous sequence before the new sequence node had been added to the DAG. The method 900 can include presenting the new sequence of online courses to a third learner (914) who had been associated with the new sequence of online courses.

According to an example, the method 900 can further include maintaining a class representing the previous sequence. The class can include a course combination field identifying the first online course and the second online course, and a base identifier field.

According to an example, the class can be an original class generated for the specialization, and the base identifier field can comprise a null value.

According to an example, the class can be a second or subsequent class generated for the specialization and the base identifier field identifies an original class generated for the specialization.

According to an example, the method 900 can further include generating a child class. The child class can identify the second online course and the third online course.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method of updating a database storing a specialization that represents a sequence of online courses, the method comprising:

presenting a previous sequence of online courses to a first learner associated with the previous sequence, the previous sequence including a first online course and a second online course, the previous sequence being represented in the database by a previous sequence node within a directed acyclic graph (DAG), the DAG including edges from the previous sequence node to at least a first course node representing the first online course in the previous sequence and a second course node representing the second online course in the previous sequence;

adding, to the DAG, a new sequence node representing a new sequence of online courses, the new sequence of online courses including the second online course and a third online course but not including the first online course, the new sequence including a base identifier field that references the previous sequence;

adding edges from the new sequence node to the first course node and the second course node based on the previous sequence node having edges with the first course node and the second course node;

removing a first edge between the new sequence node and the first course node;

adding a second edge between the new sequence node and a third course node representing a third online course for which no edge exists between the third course node and the previous sequence node;

presenting, after the new sequence node has been added to the DAG, the previous sequence of online courses to a second learner previously associated with the previous sequence before the new sequence node has been added to the DAG; and presenting the new sequence of online courses to a third learner who has been associated with the new sequence of online courses.

2. The method of claim 1, further comprising maintaining a class representing the previous sequence, the class comprising:

a course combination field identifying the first online course and the second online course; and the base identifier field.

3. The method of claim 2, wherein the class is an original class generated for the specialization and the base identifier field comprises a null value.

4. The method of claim 2, wherein the class is a second or subsequent class generated for the specialization and the base identifier field identifies an original class generated for the specialization.

5. The method of claim 1, further comprising generating a child class, the child class identifying the second online course and the third online course.

6. A non-transitory computer-readable storage medium comprising instructions stored thereon for updating a database storing a specialization that represents a sequence of online courses that, when executed by at least one processor, are configured to cause a computing system to at least:

present a previous sequence of online courses to a first learner associated with the previous sequence, the previous sequence including a first online course and a second online course, the previous sequence being represented in the database by a previous sequence node within a directed acyclic graph (DAG), the DAG including edges from the previous sequence node to at least a first course node representing the first online course in the previous sequence and a second course node representing the second online course in the previous sequence;

add, to the DAG, a new sequence node representing a new sequence of online courses, the new sequence of online courses including the second online course and a third online course but not including the first online course;

add edges from the new sequence node to the first course node and the second course node based on the previous sequence node having edges with the first course node and the second course node;

remove a first edge between the new sequence node and the first course node;
add a second edge between the new sequence node and a third course node representing a third online course for which no edge exists between the third course node and the previous sequence node;
present, after the new sequence node has been added to the DAG, the previous sequence of online courses to a second learner previously associated with the previous sequence before the new sequence node has been added to the DAG;
receive, from a third learner, a request to begin the specialization;
check a latest object to determine that the new sequence was most recently launched; and
present the new sequence of online courses to the third learner who has been associated with the new sequence of online courses.

7. The non-transitory computer-readable storage medium of claim 6, wherein the instructions are further configured to cause the computing system to maintain a class representing the previous sequence, the class comprising:
a course combination field identifying the first online course and the second online course; and
a base identifier field.

8. The non-transitory computer-readable storage medium of claim 7, wherein the class is an original class generated for the specialization and the base identifier field comprises a null value.

9. The non-transitory computer-readable storage medium of claim 7, wherein the class is a second or subsequent class generated for the specialization and the base identifier field identifies an original class generated for the specialization.

10. The non-transitory computer-readable storage medium of claim 6, further comprising generating a child class, the child class identifying the second online course and the third online course.

11. A non-transitory computer-readable storage medium comprising instructions stored thereon for updating a database storing a specialization that represents a sequence of online courses that, when executed by at least one processor, are configured to cause a computing system to at least:
present a previous sequence of online courses to a first learner associated with the previous sequence, the previous sequence including a first online course and a second online course, the previous sequence being represented in the database by a previous sequence node within a directed acyclic graph (DAG), the DAG including edges from the previous sequence node to at least a first course node representing the first online course in the previous sequence and a second course node representing the second online course in the previous sequence;
add, to the DAG, a new sequence node representing a new sequence of online courses, the new sequence of online courses including the second online course and a third online course but not including the first online course, the new sequence including a base identifier field that references the previous sequence;
add edges from the new sequence node to the first course node and the second course node based on the previous sequence node having edges with the first course node and the second course node;
remove a first edge between the new sequence node and the first course node;
add a second edge between the new sequence node and a third course node representing a third online course for which no edge exists between the third course node and the previous sequence node;
present, after the new sequence node has been added to the DAG, the previous sequence of online courses to a second learner previously associated with the previous sequence before the new sequence node has been added to the DAG; and
present the new sequence of online courses to a third learner who has been associated with the new sequence of online courses.

12. The non-transitory computer-readable storage medium of claim 11, further comprising maintaining a class representing the previous sequence, the class comprising:
a course combination field identifying the first online course and the second online course; and
the base identifier field.

13. The non-transitory computer-readable storage medium of claim 12, wherein the class is an original class generated for the specialization and the base identifier field comprises a null value.

14. The non-transitory computer-readable storage medium of claim 12, wherein the class is a second or subsequent class generated for the specialization and the base identifier field identifies an original class generated for the specialization.

15. The non-transitory computer-readable storage medium of claim 11, further comprising generating a child class, the child class identifying the second online course and the third online course.

16. A method comprising:
presenting a previous sequence of online courses to a first learner associated with the previous sequence, the previous sequence including a first online course and a second online course, the previous sequence being represented in a database by a previous sequence node within a directed acyclic graph (DAG), the DAG including edges from the previous sequence node to at least a first course node representing the first online course in the previous sequence and a second course node representing the second online course in the previous sequence;
adding, to the DAG, a new sequence node representing a new sequence of online courses, the new sequence of online courses including the second online course and a third online course but not including the first online course;
adding edges from the new sequence node to the first course node and the second course node based on the previous sequence node having edges with the first course node and the second course node;
removing a first edge between the new sequence node and the first course node;
adding a second edge between the new sequence node and a third course node representing a third online course for which no edge exists between the third course node and the previous sequence node;
presenting, after the new sequence node has been added to the DAG, the previous sequence of online courses to a second learner previously associated with the previous sequence before the new sequence node has been added to the DAG;
receiving, from a third learner, a request to begin a specialization;
checking a latest object to determine that the new sequence was most recently launched; and presenting the new sequence of online courses to the third learner who has been associated with the new sequence of online courses.

17. The method of claim 16, wherein the method further includes maintaining a class representing the previous sequence, the class comprising:
   a course combination field identifying the first online course and the second online course; and
   a base identifier field.

18. The method of claim 17, wherein the class is an original class generated for the specialization and the base identifier field comprises a null value.

19. The method of claim 17, wherein the class is a second or subsequent class generated for the specialization and the base identifier field identifies an original class generated for the specialization.

20. The method of claim 16, further comprising generating a child class, the child class identifying the second online course and the third online course.

* * * * *